United States Patent
Jeal

(10) Patent No.: US 6,173,093 B1
(45) Date of Patent: *Jan. 9, 2001

(54) OPTICAL ADD/DROP WAVELENGTH DIVISION MULTIPLEX SYSTEMS

(75) Inventor: Alan James Jeal, Kent (GB)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/051,816

(22) PCT Filed: Aug. 18, 1997

(86) PCT No.: PCT/GB97/02217

§ 371 Date: Apr. 17, 1998

§ 102(e) Date: Apr. 17, 1998

(87) PCT Pub. No.: WO98/08322

PCT Pub. Date: Feb. 26, 1998

(30) Foreign Application Priority Data

Aug. 19, 1996 (GB) .................................... 9617396

(51) Int. Cl.[7] ........................................ G02B 6/26
(52) U.S. Cl. .................................................. 385/24
(58) Field of Search ................................. 359/114, 124; 385/24

(56) References Cited

U.S. PATENT DOCUMENTS 5,778,118 * 7/1998 Sridhar .................................... 385/24
5,822,095 * 10/1998 Taga et al. ........................... 359/127

* cited by examiner

*Primary Examiner*—Hung N. Ngo
(74) *Attorney, Agent, or Firm*—Ware, Fressola, Van Der Sluys & Adolphson LLP

(57) ABSTRACT

A method of, and system for, controlling one or more wavelength channels added to an optical fiber trunk of a WDM system from a branch terminal via a saturated amplifier in which an additional wavelength signal different from the wavelength of wanted channels is introduced to the input of the saturated amplifier to reduce the level of the added wanted channel(s).

18 Claims, 1 Drawing Sheet

OPTICAL ADD/DROP WAVELENGTH DIVISION MULTIPLEX SYSTEMS

BACKGROUND OF THE INVENTION

1. Field of the Invention

This invention relates to improvements in optical add/drop wavelength division multiplex (WDM) systems and more particularly to the control of add channel level in such systems. the invention has particular application in underwater cable systems employing optical fibre cables.

In WDM transmission systems several wavelengths are transmitted along a main trunk which is provided with one or more branching units each of which is arranged to route one or more particular wavelength channels to an individual branch terminal, so called drop channels. The branch terminal is arranged to add one or more channels of the same or different wavelengths to the trunk. Such systems require the control of power levels of the added channels under normal operating and fault conditions to ensure that individual channels are not excessively impaired compared to other channels. In the case of branches which include saturated optical repeater amplifiers which introduce several dBs of compression the delicate balance of optical powers in individual channels can easily be upset or irrevocably impaired. The present invention seeks to provide simple adjustment or control of the amplitude of add channels provided by such an amplifier.

BRIEF SUMMARY OF INVENTION

According to the invention there is provided a method of, and system for, controlling the level of one or more wavelength channels added to an optical fibre trunk of a WDM system from a branch terminal via a saturated amplifier in which an additional wavelength signal differed from the wavelength of wanted channels is introduced to the input of the saturated amplifier to reduce the level of the added wanted channel(s).

Preferably the additional wavelength signal is variable in level, or step adjustable, to permit control of the level of the added signal(s).

Preferably the additional wavelength signal is supplied from the branch terminal.

DETAILED DESCRIPTION OF INVENTION

Figure 1:
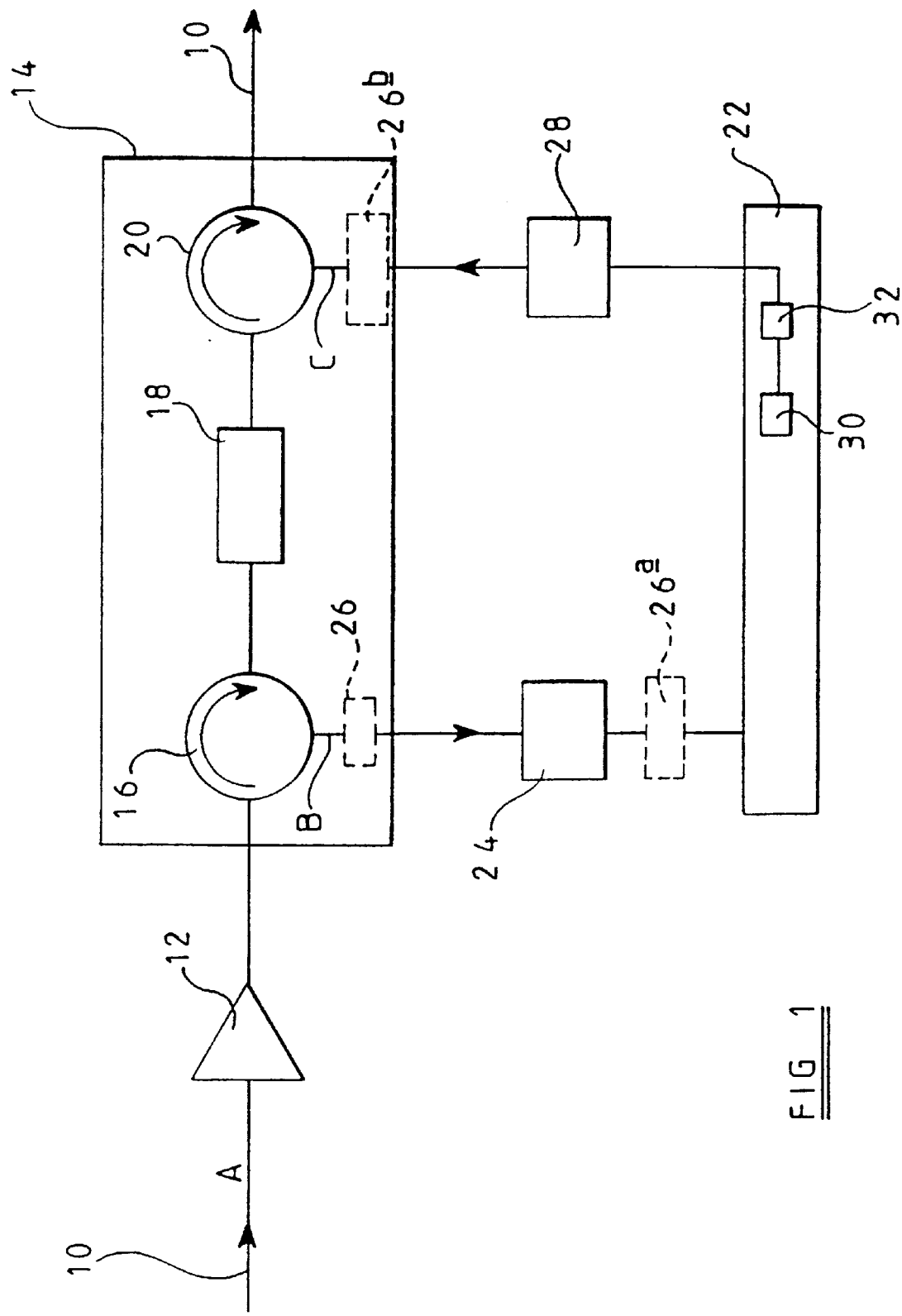
FIG. 1 is a schematic view of an add/drop wavelength division multiplex system according to the invention.

The single drawing FIG. 1, illustrates schematically by way of example only, a method and system in accordance with the invention and, for clarity of description, only a single fibre and single branch is shown although it will be appreciated that the invention is applicable to multiple fibre and/or multiple branch systems.

A main trunk 10 has an optical amplifier or repeater 12, and a branching unit 14. The branching unit has a first three port circulator 16 connected in series with a filter 18 and a second three port circulator 20. One port of the first circulator is coupled to a branch terminal 22 via a drop channel including an optical amplifier or repeater 24 and an optional filter 26. The other circulator 20 has one port connected to an add channel including an optical amplifier 28 to the branch terminal 22. The amplifier 28 is a saturated amplifier and the maximum power available is shared between the various different channel wavelengths to be added to the trunk. By providing an additional optical wavelength at a frequency not required for transmission of information on the trunk as an input to the amplifier 28, the output level of the other wanted wavelength channels added to the trunk are reduced. The additional optical wavelength may be such that it will pass back through the filter 18 to the first circulator 16 and along the drop channel. The drop channel may include a filter 26 or 26a to prevent passage of the additional wavelength. Such a filter 26b may alternatively be provided in the add channel between the amplifier 28 and second circulator 20.

The additional optical wavelength may be provided by the branch terminal. Such an optical wavelength may be provided by an optical control signal generator 30 in the branch terminal 22 or at some other point in the system that permits routing of the signal to the input of the amplifier. The additional optical wavelength may be variable in amplitude or adjustable in steps to control the level of the channels added to the trunk. Such variation may be effected by means of an amplitude controller or attenuator 32 in the branch terminal.

The input to the optical amplifier at A has several data channels at different wavelengths. The signal at output B is split so that one or more channels is diverted to a different destination. At point C a return signal from a second destination i.e. branch terminal 22 is reinserted onto the main signal path. At point C it is important that the injected signal level is controlled so that there is no degradation of the signals passing through the main path.

With an unrepeatered drop path then the add level may be controlled directly from the terminal. With a repeatered drop path then control of the add signal is more difficult because prior to the present invention there was no simple way by which the signal level could be controlled from the terminal because of the self regulation of the amplifiers which are in compression.

This invention relates to a method of, and system for controlling the add signal level provided by one or more amplifiers between the terminal and the add point C of the system.

Looking at an application of the invention from another viewpoint, in repeatered WDM systems the control of added signals to the trunk is critical to ensure that the pre-emphasis levels are preserved to minimise the system penalties. This can be carried out using a controlled gain amplifier prior to the injection point. The proposed method controls the level of the added signal by sending a level control signal from, for example, the terminal at the start of the system such that it takes some of the output power of the injection amplifier. By varying the pre-emphasis level of the control signal at the terminal the output level of the added signal may be varied to optimise the pre-emphasis at the injection point.

By employing, the invention, simple control of the added signal level at the injection point may be effected without the need to be able to control the gain of the injection amplifier remotely via a supervisory control channel thus making the design of the amplifier very simple.

What is claimed is:

1. A wavelength division multiplex optical transmission system comprising:
   (a) a main trunk;
   (b) a branching unit arranged to drop one or more wavelength channels from the main trunk via a drop channel and to add an added signal of one or more wanted add wavelength channels to the main trunk via an add channel;

(c) a branch terminal providing the one or more wanted add wavelength channels to the add channel;

(d) a saturated amplifier connected in the add channel between the branch terminal and the branching unit and having the wanted add channel wavelengths on the add channel as an input; and (e) means for generating an additional optical wavelength signal and providing the additional optical wavelength signal as an input to the saturated amplifier, the additional optical wavelength signal having a wavelength different from the wanted add wavelength channels, thereby reducing the level of the wanted add wavelength channels provided to the branching unit on the add channel.

2. A wavelength division multiplex optical transmission system as claimed in claim 1, wherein the means for generating an additional optical wavelength signal is an optical control signal generator provided in the branch terminal.

3. A wavelength division multiplex optical transmission system as claimed in claim 1 and further comprising means for varying the level of the additional optical wavelength signal provided as an input to the saturated amplifier.

4. A wavelength division multiplex optical transmission system as claimed in claim 3, wherein the means for varying the additional optical wavelength signal is adjustable in steps.

5. A wavelength division multiplex optical transmission system as claimed in claim 1 and further comprising a filter provider in the drop channel to prevent passage of the additional optical wavelength signal.

6. A wavelength division multiplex optical transmission system as claimed in claim 5, wherein the drop channel further includes an amplifier and the filter is provided prior to the amplifier in the drop channel.

7. A wavelength division multiplex optical transmission system as claimed in claim 1 and further comprising a filter provided in the add channel between the saturated amplifier and the branching unit, to prevent passage of the additional optical wavelength signal.

8. A wavelength division multiplex optical transmission system as claimed in claim 1 and further comprising a filter provider in the add channel between the saturated amplifier and the main trunk, to prevent passage of the additional optical wavelength signal.

9. A wavelength division multiplex optical transmission system as claimed in claim 1, wherein the branching unit comprises first and second three port optical circulators, the first three port optical circulator having a first port connected to the main trunk for receiving incoming signals, a second port coupled via a filter to a first port of the second optical circulator, and a third port coupled to the drop channel, the second three port optical circulator having a second port coupled to the main trunk for transmitting outgoing signals and a third port is coupled to the add channel.

10. A method of controlling the level of one or more wanted add wavelength channels added to an optical fiber trunk of a wavelength division multiplex optical transmission system comprising:

(a) providing the one or more wanted add wavelength channels to the input of a saturated amplifier;

(b) providing an additional optical wavelength signal to the input of the saturated amplifier at a wavelength different from the wavelengths of the one or more wanted add wavelength channels;

(c) providing the output of the saturated amplifier on an add channel to the optical fiber trunk.

11. The method claimed in claim 10 wherein the one or more wanted add wavelength channels are provided from a branch terminal.

12. A method as claimed in claim 10, and further comprising varying the level of the additional optical wavelength signal to adjust the level of the one or more wanted add wavelength channel on the output of the saturated amplifier.

13. A method as claimed in claim 12, comprising varying the level of the additional optical wavelength signal in steps.

14. A method as claimed in claim 10, and further comprising filtering the output of the saturated amplifier provided to the channel to prevent passage of the additional optical wavelength signal to the optical fiber trunk.

15. A method as claimed in claim 10, and further comprising filtering a drop channel of the wavelength division multiplex optical transmission system to prevent passage of the additional optical wavelength signal from the optical fiber trunk to a branch terminal connected to the drop channel.

16. A wavelength division multiplex optical transmission system comprising:

(a) a main trunk;

(b) a branching unit interposed in the main trunk, the branching unit having first and second circulators each having first, second and third ports, the trunk connected to the first port of the first circulator, the second port of the first circulator connected to the first port of the second circulator, and the second port of the second circulator connected to the main trunk for passing wavelength channels along the main trunk;

(c) a drop channel connecting the third port of the first circulator to a branch terminal for transferring one or more wavelength channels from the main trunk, the drop channel including an amplifier;

(d) an add channel connecting the branch terminal to the third port of the second circulator for transferring one or more wanted add wavelength channels to the main trunk, the add channel including a saturated amplifier;

(e) an optical control signal generator in the branch terminal for generating an additional optical wavelength signal on the add channel at a wavelength different from the wavelengths of the one or more wanted add wavelength channels, the additional optical wavelength signal thereby provided as an input to the saturated amplifier and adjusting the level of the one or more wanted add wavelength channels; and (f) at least one filter for removing the additional optical wavelength signal from the wavelength division multiplex optical transmission system after adjustment of the level of the one or more wanted add wavelength channels.

17. A wavelength division multiplex optical transmission system as claimed in claim 10, wherein the filter is in the add channel between the saturated amplifier and the third port of the second circulator.

18. A wavelength division multiplex optical transmission system as claimed in claim 10, wherein the filter is in the drop channel between the third port of the first circulator and the amplifier in the drop channel.

\* \* \* \* \*

UNITED STATES PATENT AND TRADEMARK OFFICE
CERTIFICATE OF CORRECTION

PATENT NO. : 6,173,093 B1
DATED : January 9, 2001
INVENTOR(S) : Alan James Jeal

It is certified that error appears in the above-identified patent and that said Letters Patent is hereby corrected as shown below:

Column 3, claim 5,
Line 30, "provider" should be -- provided --.

Column 3, claim 8,
Line 43, "provider" should be -- provided --.

Column 4, claim 17,
Line 58, "10" should be -- 16 --.

Column 4, claim 18,
Line 62, "10" should be -- 16 --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*